(12) United States Patent
Downey et al.

(10) Patent No.: US 9,505,530 B2
(45) Date of Patent: Nov. 29, 2016

(54) SPILL-PREVENTING SNACK CONTAINER AND DISPENSER

(71) Applicant: BIG MONSTER TOYS LLC, Chicago, IL (US)

(72) Inventors: Paul Gordon Downey, Oak Park, IL (US); Robert James Civettini, Chicago, IL (US); Donald Alfred Rosenwinkel, Oak Park, IL (US)

(73) Assignee: BIG MONSTER TOYS LLC, Chicago, IL (US)

( * ) Notice: Subject to any disclaimer, the term of this patent is extended or adjusted under 35 U.S.C. 154(b) by 0 days.

(21) Appl. No.: 14/911,346

(22) PCT Filed: Sep. 4, 2015

(86) PCT No.: PCT/US2015/048641
§ 371 (c)(1),
(2) Date: Feb. 10, 2016

(87) PCT Pub. No.: WO2016/037107
PCT Pub. Date: Mar. 10, 2016

(65) Prior Publication Data
US 2016/0264315 A1    Sep. 15, 2016

Related U.S. Application Data

(60) Provisional application No. 62/046,761, filed on Sep. 5, 2014.

(51) Int. Cl.
*G01F 11/28* (2006.01)
*B65D 47/08* (2006.01)
(Continued)

(52) U.S. Cl.
CPC ............ *B65D 47/08* (2013.01); *B65D 25/04* (2013.01); *B65D 43/16* (2013.01); *B65D 43/26* (2013.01)

(58) Field of Classification Search
CPC ...... B65D 47/08; B65D 25/04; B65D 43/16; B65D 43/26

USPC .......... 222/424.5, 454–457, 5, 142.1, 142.9; 220/521–523; 221/188, 189, 288, 231, 221/247–250, 210
See application file for complete search history.

(56) References Cited

U.S. PATENT DOCUMENTS

| 6,112,942 A | 9/2000 | Deacon |
| 6,179,124 B1 * | 1/2001 | Oka et al. ............ B43K 31/005 206/443 |

(Continued)

FOREIGN PATENT DOCUMENTS

| JP | 2000-247381 A | 9/2000 |
| JP | 2003-292069 A | 10/2003 |
| JP | 2012-171684 A | 9/2012 |

OTHER PUBLICATIONS

International Search Report and Written Opinion dated Nov. 24, 2015, from the corresponding PCT/US2015/048641.

*Primary Examiner* — Lien Ngo
(74) *Attorney, Agent, or Firm* — Katten Muchin Rosenman LLP

(57) ABSTRACT

A food dispensing container having a removable dispensing member that includes a hinged flow gate configured to cover, in a closed position, a corresponding aperture in a bottom of a dispensing compartment of the dispensing member. The dispensing member also includes a hinged lid configured to cover a top of the dispensing compartment, the hinged lid having a notch that allows a range of rotation of the hinged flow gate when the hinged lid is in a closed position covering the top of the dispensing compartment and the rotation of the hinged flow gate opening the corresponding aperture when the food dispensing container is tilted from an upright position. The hinged lid and the hinged flow gate interlock, limiting the hinged flow gate to the closed position, when the hinged lid is in an open position uncovering the top of the dispensing compartment.

5 Claims, 14 Drawing Sheets

(51) Int. Cl.
  *B65D 25/04* (2006.01)
  *B65D 43/16* (2006.01)
  *B65D 43/26* (2006.01)

(56) References Cited

U.S. PATENT DOCUMENTS 7,036,681 B2 * 5/2006 Suda et al. ......... B65D 83/0409
  221/210
7,100,797 B2 * 9/2006 Kahn et al. ........... A61J 7/0076
  221/263
7,156,256 B2 * 1/2007 Senda et al. ........... B65D 85/60
  221/172
7,243,817 B2 * 7/2007 Giraud ............... B65D 83/0409
  221/190
8,528,771 B2 * 9/2013 Voss et al. ........... B65D 47/065
  206/222
2007/0262097 A1  11/2007 Antal

* cited by examiner

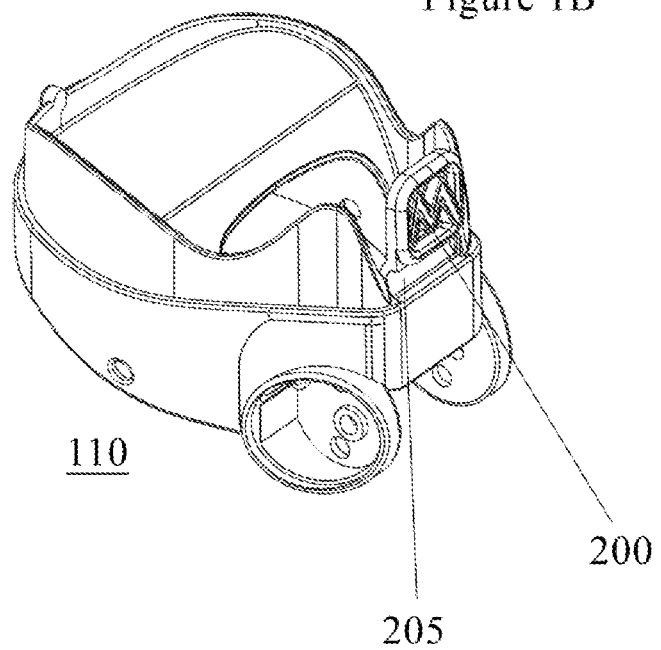

SPILL-PREVENTING SNACK CONTAINER AND DISPENSER

BACKGROUND OF THE INVENTION

1. Field of the Invention

The present invention relates generally to food dispensers and more particularly to a snack container and dispenser that prevents spills.

2. Description of Related Art

Children love to eat snacks such as cereal, small candies such as coated chocolate candies, nuts and the like. However, when a child, especially a young child like a toddler, attempts to carry a snack container around, it inevitably gets spilled, because while the child can get the snacks out with a hand or fingers, they cannot manage to keep the container upright. Also, when a child scoops out a quantity of the snack, there is no control on how much is scooped. In many cases, it is more than the child can control, and the overfilled hand or fingers lose materials resulting in unwanted spills.

It would be extremely advantageous to have a snack dispenser that can be refilled with a favorite snack that dispenses a small amount of the snack into a dispensing area (which can also be a lid) by simply turning the dispenser or by pushing a button and turning the dispenser.

SUMMARY OF THE INVENTION

The present invention relates to a snack carrying container that allows a correct amount of material for dispensing to move from the body of the container into the lid or dispensing area by turning the container upside down, or by pressing a button to open a flow gate and turning the container upside down for dispensing. The child can access the dispensed portion easily for consumption while the bulk of the contents are closed in the body of the container and prevented from spilling. One embodiment of the present invention is a four-piece, cup size, snack container that stores and releases a fixed amount of treats when the child closes the lid, briefly turns the unit upside down and opens the lid again. This container prevents the child from spilling the entire contents while eating the snacks. In addition, a snack container according to the present invention is not only spill free but also keeps the stored snack clean and free from dirt and germs due to recontamination of the snack. Recontamination is typical in most snack dispensers, where a child may repeatedly touch the stored snacks. Since the child never puts his or her hands back in the storage unit of the snack container of the present invention, it prevents the snack from getting touched every time the child grabs a snack. And, thus, the container prevents the possibility of recontamination. It also does not expose the snack to the outside environment, reducing the possibility of the snack getting stale in the short term.

According to a first aspect of the present invention, a novel combination of structure is provided for a snack dispensing container including a storage compartment and a dispensing compartment in material communication through a gate, the gate being hinged to permit material flow or prevent material flow, the snack dispensing container also including a lid in communication with the gate wherein, when the lid is closed, the gate can swing open allowing material flow from the storage compartment into the dispensing compartment when the snack dispensing container is inverted, and when the lid is open, the gate is locked closed preventing said material flow.

According to a second aspect of the present invention, a novel combination of structure is provided for a snack dispensing container comprising a button configured to open the hinged flow gate when pressed.

According to a third aspect of the present invention, a novel combination of structure is provided for a snack dispensing container comprising said storage compartment being segmented into a plurality of sub-compartments, one of the sub-compartments being selectable by a rotatable window between the storage compartment and the dispensing compartment.

BRIEF DESCRIPTION OF THE DRAWINGS

Exemplary embodiments of the presently preferred features of the present invention will now be described with reference to the accompanying drawings.

FIGS. 1A and 1B are diagrams illustrating respective components of a snack container and dispenser in accordance with an exemplary embodiment of the invention.

DETAILED DESCRIPTION OF THE PRESENTLY PREFERRED EXEMPLARY EMBODIMENTS

1. Introduction

Briefly, the preferred embodiments of the present invention provide for a snack dispenser that advantageously limits potential spills of the snack food within its container.

2. The Structure of the Preferred Embodiment

Figure 1A:
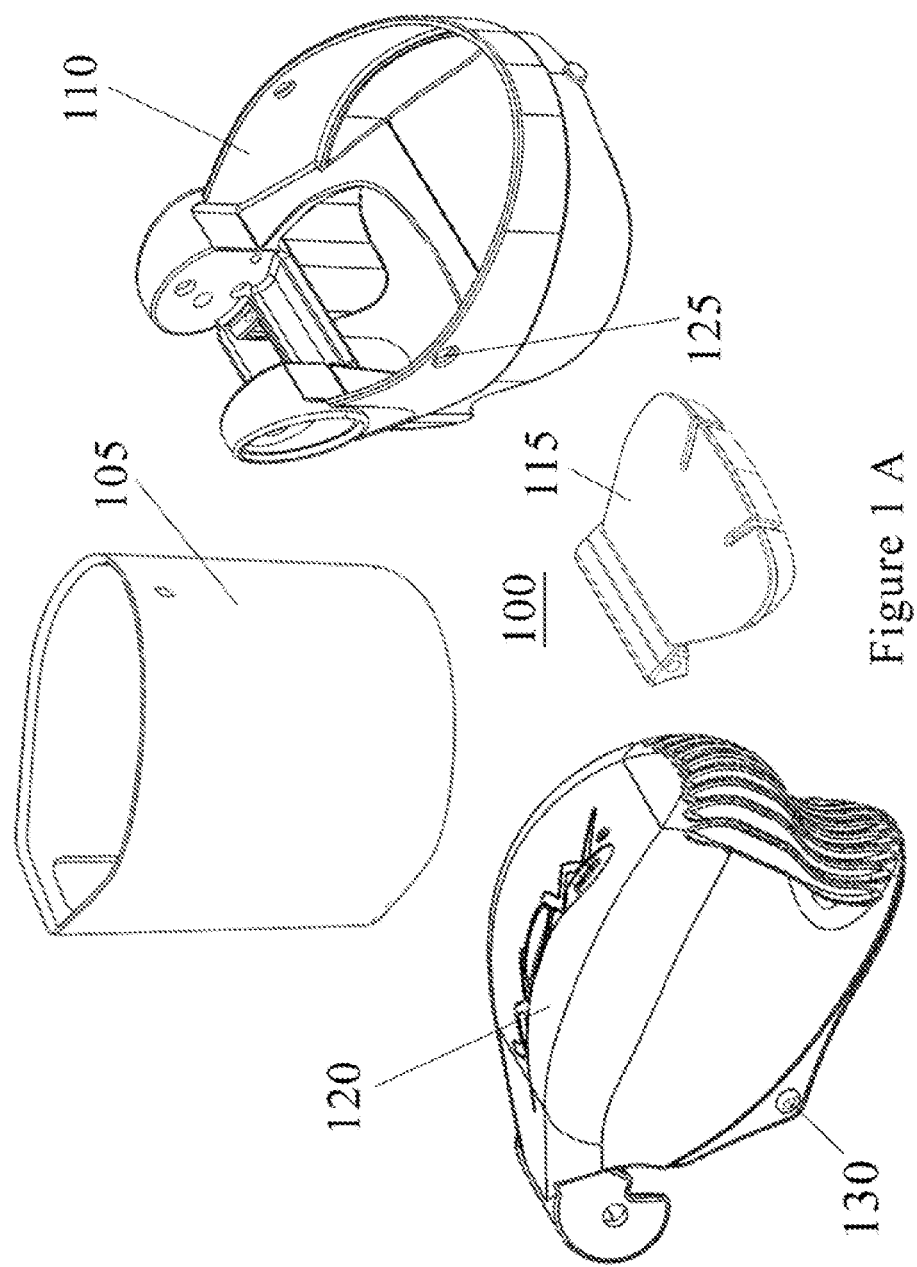

With reference to FIG. 1A, the snack container 100 according to an embodiment of the invention may comprise four molded parts that are assembled together in the manner illustrated for ease of manufacturing. As shown in FIG. 1A, the snack container 100 includes a reservoir 105 as a main storage for the snack. A dispensing cup 110 is detachably inserted on top of the reservoir 105. And a flow gate 115 may be attached to the dispensing cup 110 on a hinge such that it can move between open and closed positions in relation to an aperture disposed in the dispensing cup 110, covering the aperture in the closed position. An outer cap (or lid) 120 may be attached to the dispensing cup 110 on another hinge such that the cap can be opened and closed. The dispensing cup 110 may include one or more holes or notches 125 that interact with one or more corresponding protrusions 130 on the cap 120 element for holding the cap 120 in the closed position. According to an exemplary embodiment of the invention, the holes 125 and protrusions 130 on the cap 120 may include smoothed edges and angles for an interlocking relationship that is easily released with a small amount of force—for example, by a small child—in opening the cap 120 in relation to the dispensing cup 110.

FIG. 1B illustrates a back side of dispensing cup 110 showing a release button 200 disposed at an end of a section 205. Operations in connection with this release button 200 is discussed below in detail in view of FIGS. 2A-2E.

Figure 2A:
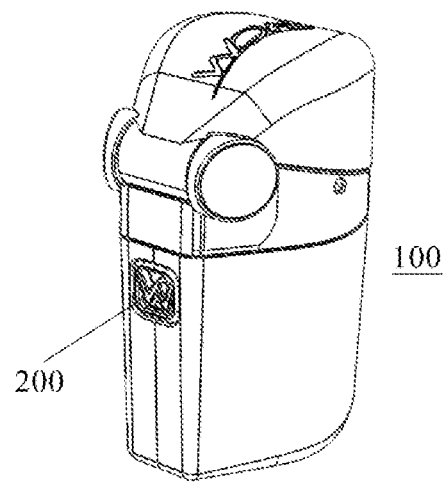
FIGS. 2A, 2B, 2C, 2D, and 2E illustrate steps for using a snack container and dispenser according to an exemplary embodiment of the invention.

FIGS. 2A, 2B, 2C, 2D, and 2E illustrate a process for using the snack container according to the invention. As shown in FIG. 2A, the snack container 100 may be opened by pushing a release button 200 on the dispensing cup 110 to disengage it from a corresponding aperture in the reservoir 105 while pulling the reservoir 105 and the dispensing cup 110 (and the attached cap/lid 120) apart. In contrast to the interlocking relationship between holes 125 and protrusions 130, the engagement between the release button 200 and the corresponding aperture in reservoir 105 may require additional strength and dexterity such that a toddler could not separate the dispensing cup 110 from the reservoir 105. For example, the section 205 of the dispensing cup 110 comprising the release button 200 may be made of a material—e.g., composite, and the like—of sufficient rigidity so that a threshold amount of pressure is needed on the release button 200 to disengage it from the corresponding aperture in the reservoir 105.

Figure 2B:
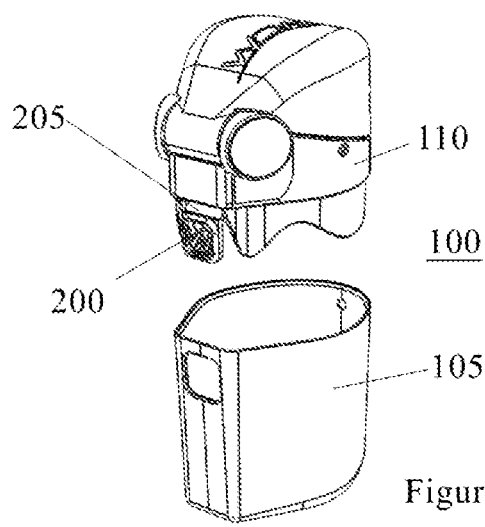

As shown in FIG. 2B, snack food—such as cereals, crackers, or any kind of finger snacks for small children—may be filled in the reservoir cup 105—for example, to about ⅔ full. According to an exemplary embodiment of the invention, the reservoir cup 105 may include a molded indicator line to mark an ideal filling level, such as ⅔ full.

Figure 2C:
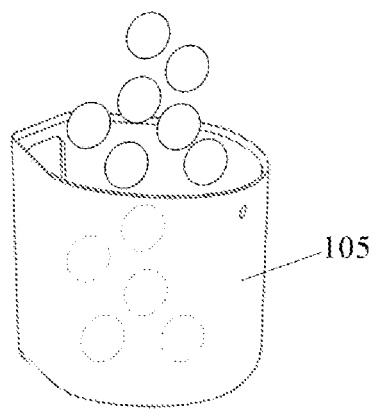
Figure 2D:
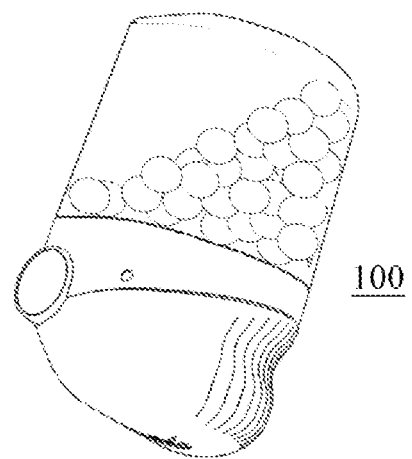
Figure 2E:
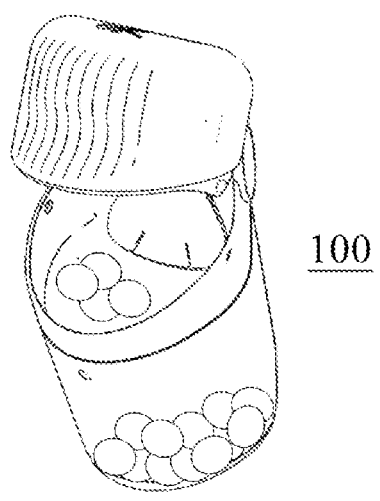

After the snack food has been filled into the reservoir cup 105, as shown in FIG. 2C, the dispensing cup 110, along with attached cap 120, may be re-inserted to the reservoir cup 105. With the cap/lid 120 closed, the snack cup 100 may be turned upside down, as shown in FIG. 2D, and given a shake or two, whereby a portion of the snack food in the reservoir cup 105 is allowed through the aperture in the dispensing cup 110. As will be described in further detail below, the flow gate 115 pivots to an open position when the snack cup 100 is flipped upside down with the cap 120 closed, thereby allowing the snack food in the reservoir cup 105 to be dispensed to dispensing cup 110. And when the snack cup 100 is flipped back over right side up, the flow gate 115 pivots back to the closed position, preserving the dispensed snack food in the dispensing cup 110 while preventing additional snack food from spilling out of the reservoir cup 105. And the user may open the lid and enjoy the snacks in the dispensing cup 110, as illustrated in FIG. 2E. When the dispensing cup is empty, the user may close the lid and repeat the process of turning the snack cup 100 upside down and shaking it to add more of the snack food from the reservoir cup 105 to the dispensing cup 110.

Figure 3:
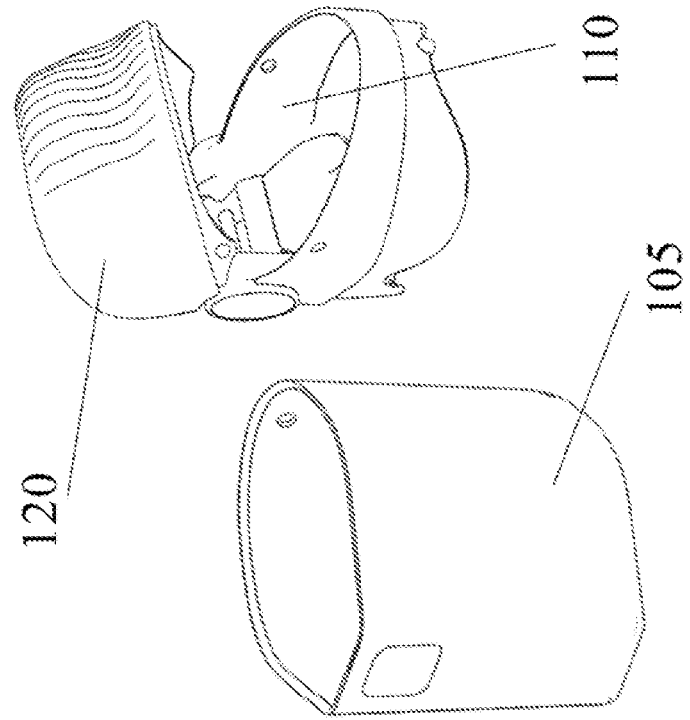
FIG. 3 is a diagram showing an assembled and a disassembled snack container and dispenser according to an exemplary embodiment of the invention.
Figure 3:
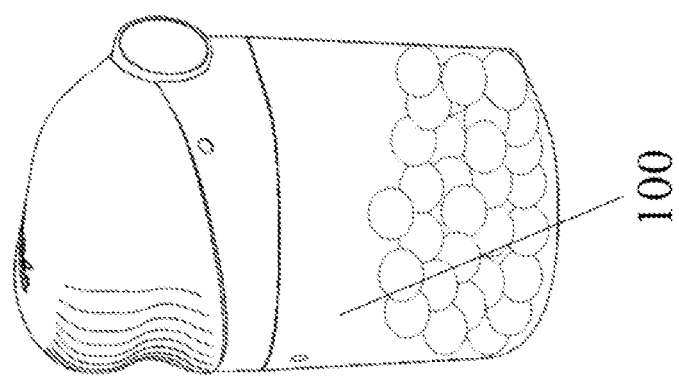

FIG. 3 is a perspective view of the reservoir cup (base container) 105, the dispensing cup 110 with lid 120 in an open position, and a fully assembled snack cup 100. According to an embodiment of the invention, snack cup 100 may include outer displays of various animals or characters. Also, snack cup 100 may take on alternative shapes and need not be substantially cylindrical.

Figure 4A:
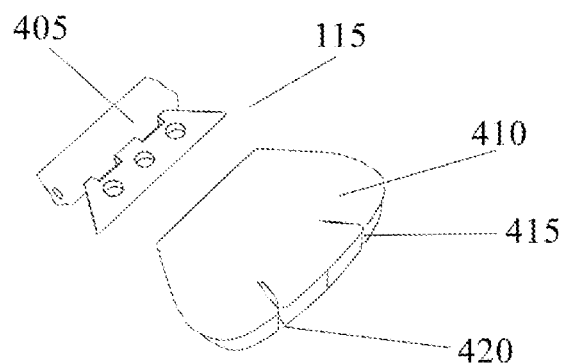
FIGS. 4A and 4B are diagrams illustrating a flow gate mechanism in the snack container and dispenser according to an exemplary embodiment of the invention.
Figure 4B:
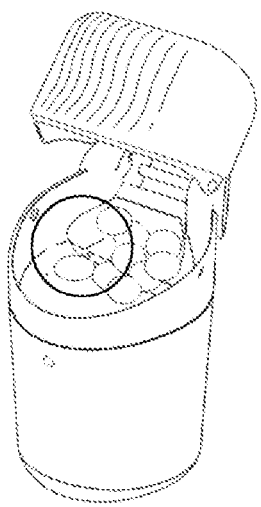

In accordance with an embodiment of the invention, flow gate 115 may be a single injection molded part. But occasionally, a piece of snack may become pinched between such a flow gate 115 and the dispensing cup 110, locking up operation. As illustrated and described in further detail below, if the gate 115 could not fully close, the lid 120 could not be opened—as part of the spill prevention feature of the invention. Thus, according to an exemplary embodiment of the invention, flow gate 115 may comprise two separate parts made of different materials. As shown in FIG. 4A, flow gate 115 may comprise a hinge portion 405 that is made of a rigid plastic in order to swing freely and operate as a locking mechanism. And a front edge portion (or "tongue") 410 of the flow gate 115 can be a separate piece made of silicone. The flexibility of the silicone allows the tongue 410 some bend as the lid 120, while it is being opened, forces the gate 115 closed. And any stuck piece of food between the tongue 410 and the aperture rim in the dispensing cup 110, as shown in FIG. 4B, can be pulled out by hand or just allowed to remain and subsequently fall into the dispenser cup with the next inverted shake. Additionally, the tongue 410 may have a perforated edge (as illustrated by notches 415 and 420) so that should food get wedged, just a part of the tongue would be stuck open—the rest of the flow gate 115 would still be fully closed to prevent spills. As described above, tongue 410 may be made with a flexible food grade silicone, or any similar composite plastic material. The two pieces could be co-molded or made as two separate pieces and assembled together.

Figure 5A:
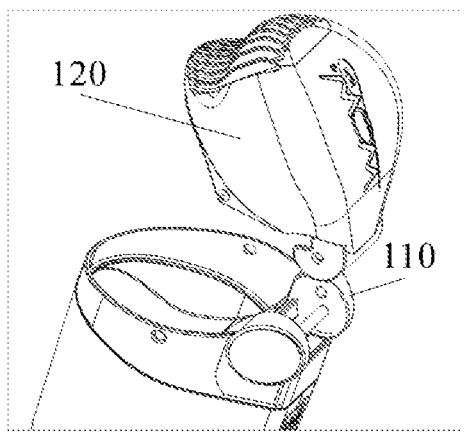
FIGS. 5A and 5B are diagrams showing the hinged assembly for the lid and flow gate, respectively, for the snack container and dispenser in accordance with an exemplary embodiment of the invention.
Figure 5B:
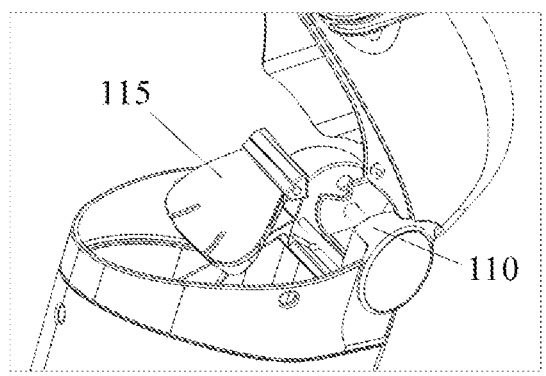

FIGS. 5A and 5B illustrate the respective hinged connections of the lid 120 and the flow gate 115 to the dispensing cup 110. As shown in FIG. 5A, the lid 120 may be hinged to the dispensing cup 110 to allow for approximately 90 degrees of rotation of the lid 120 between the closed position and a final resting open position. And as shown in FIG. 5B, the flow gate 115 may be hinged to the dispensing cup 110 within a corresponding recess that limits a rotation of the flow gate 115 in its open position into the dispensing cup 110 while the snack cup 100 is held upside down with the lid 120 closed.

Figure 6A:
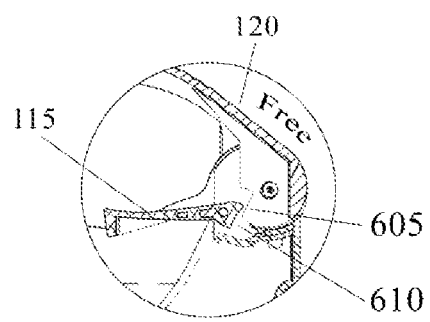
FIGS. 6A, 6B, 6C, 6D, and 6E are cutaway diagrams showing the operation of the flow gate mechanism for snack dispensing in the snack container and dispenser according to an exemplary embodiment of the invention.
Figure 6B:
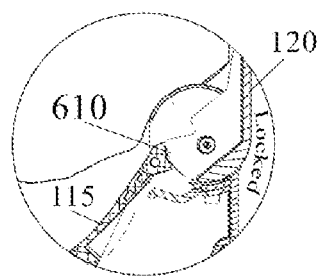
Figure 6C:
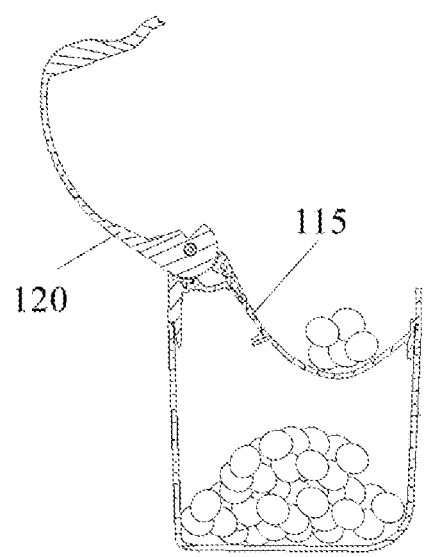
Figure 6D:
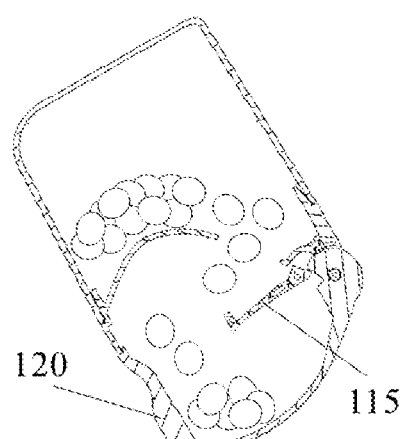
Figure 6E:
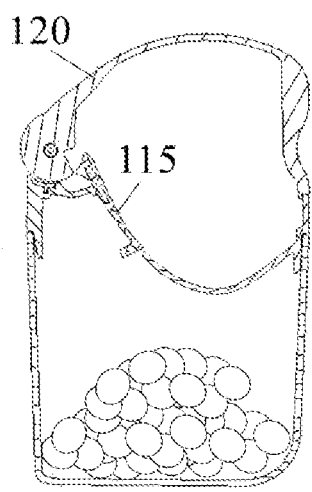

FIGS. 6A, 6B, 6C, 6D, and 6E are cutaway diagrams illustrating the interlocking hinges between the lid 120 and flow gate 115 that provide for the above-described process of dispensing snack food into the dispensing cup 110 according to an exemplary embodiment of the invention. As shown in FIGS. 6A, 6D, and 6E, the hinged connection of lid 120 includes a notch 605 that allows for a range through which the flow gate 115 can rotate around its hinge while the lid 120 is in the closed position—thus allowing for the flow gate 115 to swing open, through gravity, into the dispensing cup 110 when the snack cup 100 is inverted to an upside down position, as illustrated in FIGS. 6A and 6D. As further illustrated in FIG. 6D, a portion of the snack food in reservoir 105 flows through the aperture uncovered by the opened flow gate 115 into the dispensing cup 110. And when the snack cup 100 is returned to an upright position, flow gate 115, via gravity, swings back into the closed position through the range of rotation around its hinged connection, as illustrated in FIG. 6C—thus, separating the portion of snack food captured in the dispensing cup 110 from the remaining portion in the reservoir 105. And as illustrated in FIGS. 6B and 6C, flow gate 115 may include a corresponding notch 610 that fits around the hinged portion of lid 120 so that it is held in the closed position while the lid 120 is opened. In this way, the flow gate 115 is locked closed so that the snack food in reservoir 105 cannot be spilled out while the lid 120 is opened. And the snack cup 100, thus, dispenses snacks one mouthful at a time while preventing any spills from the reservoir 105 (container body) no matter what the position of the snack cup 100 is.

Advantageously, the snack cup 100 according to the invention provides for an ideal spill-proof snack dispenser for young children. But the device of the present invention is not just for small children. Various embodiments and styles can be used by adults, such as hikers, sports fans, on-the-go families, outdoors sports enthusiasts, pet owners, and the elderly.

Figure 7:
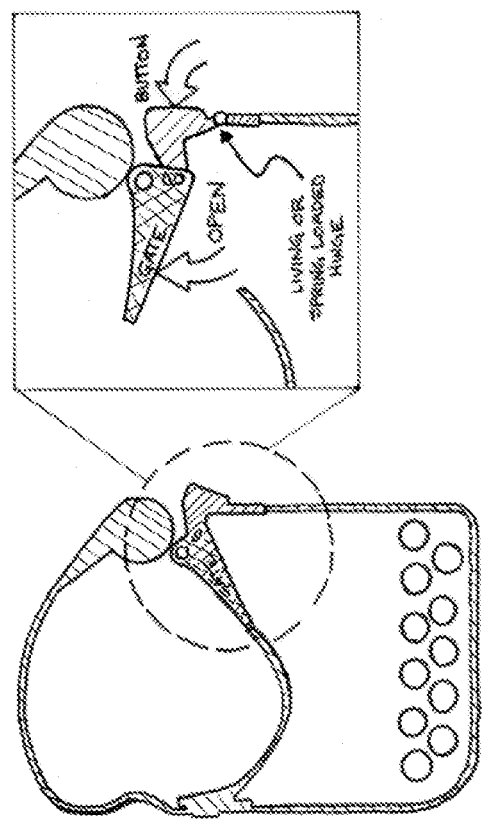
FIG. 7 is a diagram and a magnified inset showing a button-toggled flow gate in a snack container and dispenser according to an alternative embodiment of the invention.

Alternate embodiments can have a dispensing button for providing the user explicit control over the flow gate for dispensing the snack food, as shown in FIG. 7. The button would cause the release of the gate regardless of the devices orientation. Accordingly, when the snack container is used, for example, in an outdoor activity context, snack food would not be unintentionally dispensed when it is inverted, say, while it is packed away. And snack food would be dispensed only when the user wishes it to by pressing the dispensing button. The hinge connection of the dispensing button, as shown in FIG. 7, may provide, for example, spring-loaded resistance sufficient to reduce unintentional toggling.

Figure 8:
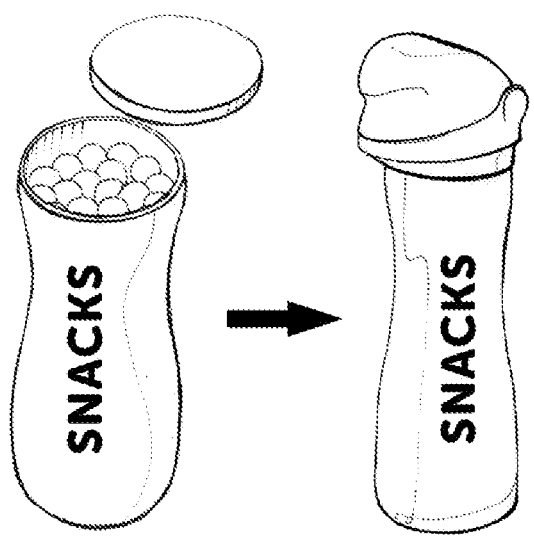
FIG. 8 illustrates a snack dispensing lid for use with a commercial snack container according to an alternative embodiment of the invention.

In some embodiments, the top section (the dispensing cup 110 and cap 120) can be attached to a third-party container, as shown FIG. 8. For example, the dispensing cup 110 and cap 120 assembly may be customized to dimensions suitable for retrofit attachment to third-party disposable containers, such as containers for store-bought snacks and the like.

Figure 9A:
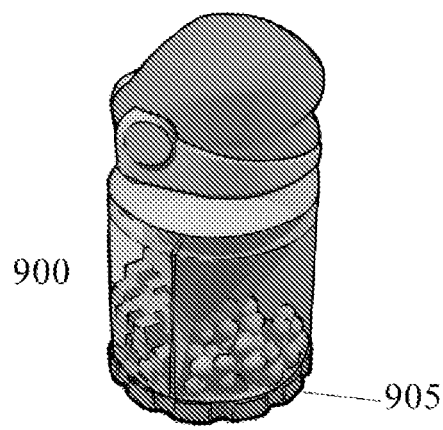
FIGS. 9A and 9B are diagrams showing a snack container and dispenser with multiple selectable container compartments according to an alternative embodiment of the invention.
Figure 9B:
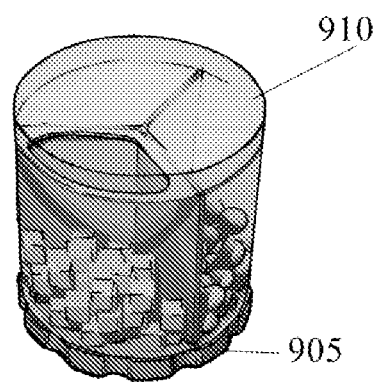

In addition, reservoir 105 may be embodiment by a vessel having multiple compartments, allowing a variety of snacks to be chosen from, as shown in FIGS. 9A and 9B. A rotating selector may be operated by rotating a knob 905 on the bottom (or alternatively by rotating the top) of the snack cup 900 that is connected to the partitions of the compartments within the reservoir 910 to align a window (the flow gate 115) with the chosen compartment. The cap mechanism as described above may fit directly above the window. FIGS. 9A and 9B show three compartments but any number of compartments is within the scope of the present invention.

The components of present invention are preferably made from molded plastic. But any rigid or semi-rigid material may be used and is within the scope of the present invention. The entire device may have parts made of different materials. For example, as described above, the base (or hinge portion) of the (flow) gate may be hard plastic, while the tip (or tongue) of the gate may be soft silicone. Any combination of materials is within the scope of the present invention. While the shape of the containers in most illustrations is cylindrical, this is not necessary; any shaped container is within the scope of the present invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. A food dispensing container comprising:
    a storage compartment;
    a dispensing member removably attached to the storage compartment, said dispensing member comprising:
        a hinged flow gate configured to cover, in a closed position, a corresponding aperture in a bottom of a dispensing compartment of the dispensing member; and
        a hinged lid configured to cover a top of the dispensing compartment, the hinged lid comprising a notch that allows a range of rotation of the hinged flow gate when the hinged lid is in a closed position covering the top of the dispensing compartment, the rotation of the hinged flow gate opening the corresponding aperture when the food dispensing container is tilted from an upright position, and wherein
    the hinged lid and the hinged flow gate interlock, limiting the hinged flow gate to the closed position, when the hinged lid is in an open position uncovering the top of the dispensing compartment.

2. The food dispensing container of claim 1, further comprising a dispensing button configured to open the hinged flow gate when toggled.

3. The food dispensing container of claim 1, wherein the storage compartment comprises a rotatable divider element for defining plural selectable snack food compartments therewithin.

4. The food dispensing container of claim 1, wherein the hinged flow gate comprises a rigid hinge portion and a flexible tongue portion.

5. The food dispensing container of claim 4, wherein the flexible tongue portion comprises a perforated edge.

* * * * *